United States Patent
Adomi et al.

[19]

[11] Patent Number: 6,148,944
[45] Date of Patent: Nov. 21, 2000

[54] ELECTRICALLY DRIVEN BICYCLE

[75] Inventors: Kenzo Adomi; Hirofumi Mitsueda, both of Kasai, Japan

[73] Assignee: Sanyo Electric Co., Ltd., Japan

[21] Appl. No.: 09/153,476

[22] Filed: Sep. 15, 1998

[30] Foreign Application Priority Data

| Sep. 16, 1997 | [JP] | Japan | 9-250384 |
| Sep. 16, 1997 | [JP] | Japan | 9-250385 |
| Sep. 16, 1997 | [JP] | Japan | 9-250386 |
| Jan. 28, 1998 | [JP] | Japan | 10-016253 |

[51] Int. Cl.[7] .................................................. B62K 11/00
[52] U.S. Cl. ......................... 180/220; 180/205; 180/68.5
[58] Field of Search ................................. 180/220, 205, 180/206, 207, 68.5, 65.1; 280/288.4

[56] References Cited

U.S. PATENT DOCUMENTS

| 4,406,342 | 9/1983 | Lacroix | 180/220 |
| 5,197,559 | 3/1993 | Garin, III et al. | 180/65.1 |
| 5,341,892 | 8/1994 | Hirose et al. | |
| 5,806,621 | 9/1998 | Soda et al. | 180/206 |
| 5,816,355 | 10/1998 | Battlogg et al. | 180/221 |

FOREIGN PATENT DOCUMENTS

| 0675037 | 10/1995 | European Pat. Off. . |
| 0686522 | 12/1995 | European Pat. Off. . |
| 0686549 | 12/1995 | European Pat. Off. . |
| 0686550 | 12/1995 | European Pat. Off. . |
| 0716009 | 6/1996 | European Pat. Off. . |
| 0728662 | 8/1996 | European Pat. Off. . |
| 4-358989 | 11/1992 | Japan . |

*Primary Examiner*—Brian L. Johnson
*Assistant Examiner*—Avraham H. Lerner
*Attorney, Agent, or Firm*—Morrison Law Firm

[57] ABSTRACT

An electrically driven bicycle includes: a driving section for driving a wheel; a battery for supplying an electric power to the driving section; and a battery case loaded with the battery and mounted onto a main frame of the bicycle, wherein the battery case is formed to have a transversal cross section that includes a recess to cover at least a part of an outer surface of the main frame, and at least a portion of the battery is inserted into an inner space on each side of the recess.

12 Claims, 11 Drawing Sheets

ELECTRICALLY DRIVEN BICYCLE

CROSS-REFERENCES TO RELATED APPLICATIONS

This application is related to Japanese patent applications No. HEI 09-250384, No. HEI 09-250385, No. HEI 09-250386, all of which were filed on Sep. 16, 1997, and No. HEI 10-016253 filed on Jan. 28, 1998, all of whose priorities are claimed under 35 USC §119.

BACKGROUND OF THE INVENTION

1. Field of the Invention

The present invention relates to an electrically driven bicycle, and more particularly to an electrically driven bicycle which utilizes a driving power of a motor for assisting a human driving power or which utilizes the driving power of the motor as a main driving power for traveling. Especially, the present invention relates to an electrically driven bicycle in which the shape of a battery case and a configuration of a battery are improved so that a user can mount and dismount the bicycle smoothly and can travel in a safe state.

2. Description of the Related Art

Figure 11:
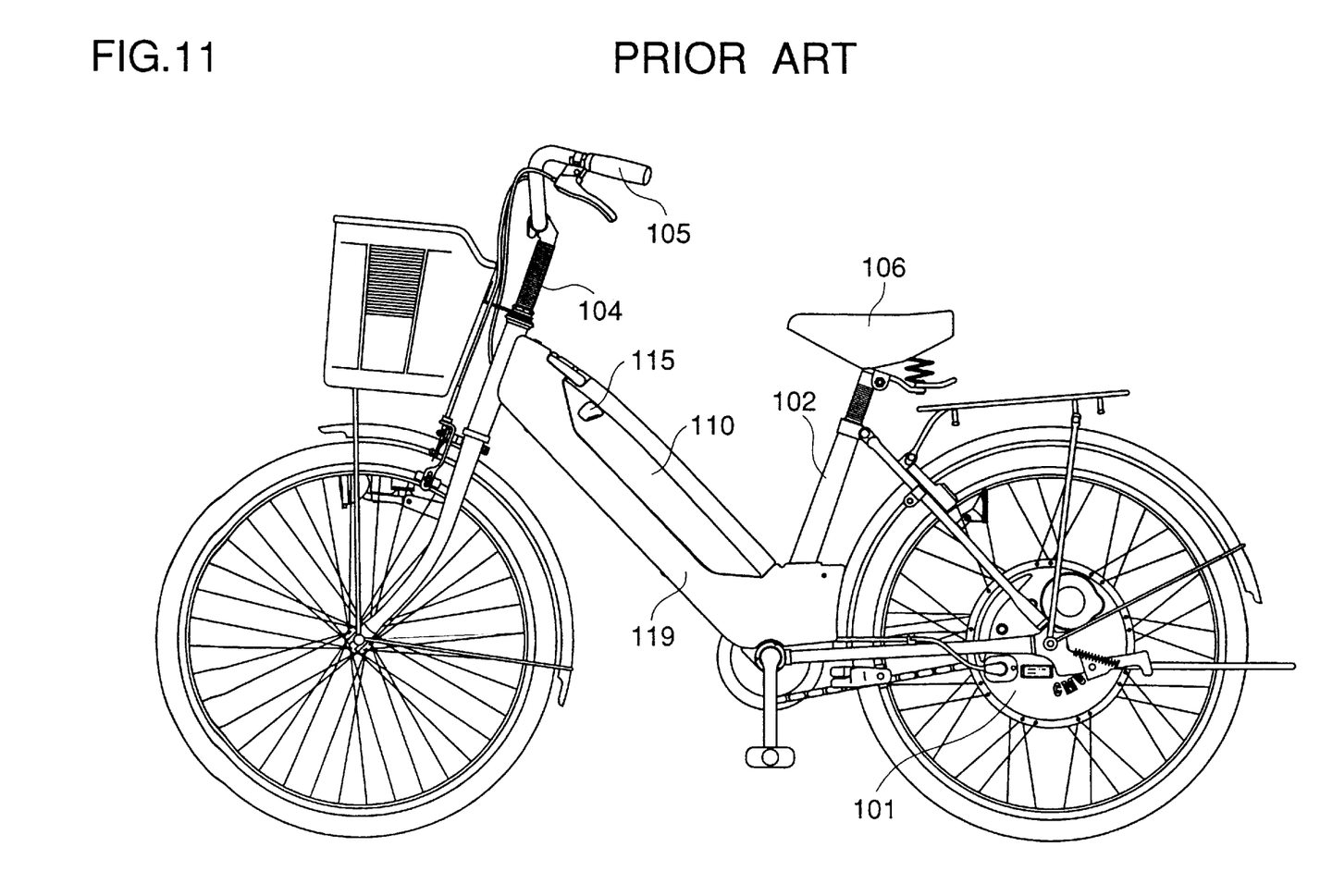
FIG. 11 is a side view of a conventional electrically driven bicycle according to one example.

In a conventional electrically driven bicycle of a certain type, a motor for driving wheels to assist a human driving power for traveling and a battery as a driving power source for the motor is mounted on the bicycle. As shown generally in FIG. 11, a main frame of the bicycle mainly includes a head pipe 104 on which a handlebar 105 is mounted, a standing pipe 102 on which a saddle 106 is mounted, and a main pipe (hidden by a battery case 110 in FIG. 11) bridging the head pipe 104 and the standing pipe 102, and the like. A structure is generally known in which the battery case 110 loaded with batteries is disposed on the main pipe, as shown in FIG. 11. The battery case 110 may be disposed in the front or in the rear of the standing pipe 102 instead of being disposed on the main pipe. In FIG. 11, the reference numeral 101 represents a driving section incorporating an electric motor, a speed reduction mechanism, a torque sensor, and the like; and the reference numeral 119 represents a frame cover that covers metal fittings provided in the main frame. The reference numeral 115 represents a cap for covering a charging connector. The cap 115 prevents intrusion of water and dust.

In the conventional electrically driven bicycle, the battery case is mounted over or under the main pipe, or in the front or in the rear of the standing pipe, as described above. Therefore, a structure is adopted in which a battery pack is prepared, for example, by making five rows each including four batteries connected in series, allowing all the batteries to be connected in series, and the battery pack is inserted into the battery case as it is. However, since each of the batteries has a diameter of about 33 mm, the height of the stacked batteries will be very high when the number of the stacked batteries is about three or more. Therefore, a problem arises such that there will be a large protuberance formed by the batteries over the main pipe or in front of the standing pipe, making it difficult to mount or dismount the bicycle.

Further, in the case where the batteries are to be disposed in the front or in the rear of the standing pipe, if the battery case is to be disposed on the chain case because of the existence of the chain case, the saddle must be mounted at a higher position, so that it will be very difficult for a less tall person to ride the bicycle because the feet cannot reach the ground so easily. On the other hand, in the case where the batteries are disposed in a space adjacent to the chain case, the bicycle is unbalanced, so that the user cannot ride the bicycle in a stable manner and, further, the batteries are not arranged in order, making the wiring complex and increasing the costs.

Moreover, if such a cap for covering the connector is provided, it may possibly be an obstacle in riding on the bicycle because the clothes or the feet of the user may be caught by the cap and, besides that, the appearance will be deteriorated, although the cap for covering the connector prevents intrusion of water and dust. Also, although the fixing member for fixing the battery to the main frame interlocks with a key, the fixing member can be actuated with the key even if the battery is not fixed to the main frame. Therefore, the user can allow the bicycle to run even if the battery is not firmly fixed to the main frame, so that the battery may possibly fall off while the bicycle is traveling.

SUMMARY OF THE INVENTION

The present invention has been made in view of these circumstances and one object thereof is to provide an electrically driven bicycle with improved facility in mounting and dismounting the bicycle by disposing the batteries separately to surround the main frame in order to provide less protuberance on each side, instead of disposing all the batteries only on one side of the main frame.

Another object of the present invention is to improve facility in mounting and dismounting the bicycle by allowing the side of the battery case facing away from the main frame (the front or upper side of the battery case) to be shaped like an arc or to have a smaller width.

Still another object of the present invention is to provide an electrically driven bicycle having a battery configuration that allows the front or upper side of the battery case to have a smaller width.

Still another object of the present invention is to provide an electrically driven bicycle having a battery configuration with good space utilization efficiency by evading the chain case if the battery case is to be disposed near the standing pipe.

Still another object of the present invention is to provide an electrically driven bicycle having a battery case without exposing the connector section to outside, thereby eliminating the need for a cap for covering the connector section, reducing the number of components in the bicycle, and providing a good appearance.

Still another object of the present invention is to provide an electrically driven bicycle in which the battery case can be firmly fixed to the main frame, thereby improving the safety of the bicycle.

Accordingly, the present invention provides an electrically driven bicycle including: a driving section for driving a wheel; a battery for supplying an electric power to the driving section; and a battery case loaded with the battery and mounted onto a main frame of the bicycle, wherein the battery case is formed to have a transversal cross section that includes a recess to cover at least a part of an outer surface of the main frame, and at least a portion of the battery is inserted into an inner space on each side of the recess.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE PREFERRED EMBODIMENTS

The present invention provides an electrically driven bicycle including: a driving section for driving a wheel; a battery for supplying an electric power to the driving section; and a battery case loaded with the battery and mounted onto a main frame of the bicycle, wherein the battery case is formed to have a transversal cross section that includes a recess to cover at least a part of an outer surface of the main frame, and at least a portion of the battery is inserted into an inner space on each side of the recess.

Here, the main frame of the bicycle refers to a principal component of a bicycle frame that constitutes the bicycle and includes a headpipe (head tube) on which a handlebar is to be mounted, a standing pipe (seat tube) on which a saddle (seat) is to be mounted, a main pipe (down tube) that bridges the head pipe and the standing pipe, and the like.

This structure avoids having the battery case protrude outward from the main frame in a single direction. The shape of the battery case is more compact and the rider can more easily mount and dismount the bicycle.

A transversal cross section of the battery case is substantially 'U'-shaped. The width of the cross section corresponding to the bottom portion of the 'U' shape is thinner than that corresponding to the upright portions of the 'U' shape. Accordingly, the width of the front or upper side of the protrusion from the main frame will be smaller, thereby greatly improving the facility in mounting and dismounting the bicycle.

The plurality of batteries to be inserted into the battery case are preferably formed into a battery assembly. Namely, the battery assembly is made of a first battery pack having n batteries (where n is an integer of two or more) arranged in a line and in series connection and two second battery packs each having n batteries arranged in a plurality of lines and in series connection.

Preferably, the battery case includes a protrusion formed opposite to the recess; the first battery pack is inserted into an inner space of the protrusion; and each of the two second battery packs is respectively inserted into the inner space on each side of the recess in such a manner that the two second battery packs are closer to each other in a direction towards the first battery pack.

Since the two second battery packs are inserted as described above so that the two second battery packs are closer to each other on the first battery pack side, the front or upper side of the battery case facing away from the main frame can be advantageously formed to have an arc-like shape or to have a smaller width.

Preferably, the electrically driven bicycle of the present invention is constructed in such a manner that the main frame includes a standing pipe and a main pipe; the standing pipe extends obliquely in a downward and forward direction from the saddle; the main pipe is connected to the standing pipe and extends obliquely in an upward and forward direction; the electrically driven bicycle further includes a chain case and a mounting platform; the chain case extends toward a rear wheel from a connecting part of the standing pipe and the main pipe; the mounting platform is disposed at the connecting part and serves to mount the battery case on the standing pipe by mounting a lower end of the battery case thereon; the battery case is provided with a narrow portion and a wide portion; the narrow portion is disposed at the lower end of the battery case and formed to have a width smaller than that of an upper portion of the battery case in a side direction so as not to interfere with the chain case; the narrow portion is provided with an output terminal for the batteries; the wide portion is disposed at the upper portion of the battery case and extends above the chain case; and the batteries are inserted into an inner space of the wide portion so that the batteries are substantially symmetrical with respect to a central plane formed by a center line of the standing pipe and a center line of the main pipe.

By providing the above construction, the batteries are substantially symmetrical with respect to the central plane in the right-and-left direction, thereby improving a stability of the bicycle. Further, the height of the battery case from a bottom of the bicycle can be made smaller by efficiently arranging other electronic components, such as an output terminal and a connector, adjacent to the chain case.

Preferably, the electrically driven bicycle of the present invention is constructed in such a manner that the batteries are rechargeable; the battery case includes a charging connector section for charging the batteries; the connector section is located at a portion of the battery case nearer to the main frame; and the battery case is mounted onto the main frame in such a manner that the connector section is hidden by the main frame.

By providing this construction, since the charging connector section is hidden by the main frame, intrusion of water and dust can be easily prevented, whereby a need for providing a cap is eliminated, thus reducing the number of components in the bicycle.

Preferably, an elastic sheet is disposed at a contacting part of the battery case and the main frame so as to fix the battery case firmly onto the main frame and to prevent wobbling of the battery case. Preferably, the elastic sheet is disposed above the charging connector section and between the battery case and the standing pipe in the case where the battery case is mounted near the standing pipe of the main frame, thereby shutting off the rain water and the like coming down along the standing pipe.

Preferably, the battery case has a structure such that the side portions of the battery case are bent towards the main frame so that the battery case covers the charging connector section, thereby further protecting the charging connector section from the rain water and the like. Specifically, it is preferable that the battery case is formed to have a substantially U-shaped transversal cross section and is mounted a structural member of the main frame, and the charging connector section is disposed at a bottom of the U-shaped portion.

Preferably, the electrically driven bicycle of the present invention further includes a mount detecting means and a fixing means; the mount detecting means detects that the battery case is mounted to a predetermined position of the main frame; the fixing means fixes the battery case to the main frame, whereby the fixing means fixes the battery case to the main frame only when the mount detecting means detects that the battery case is mounted to the main frame.

In other words, in the case where the battery case is to be mounted on the main frame, the detecting means does not detect that the battery case is mounted and the fixing means cannot fix the battery case onto the main frame until the battery case is firmly mounted to the main frame. When the battery case is firmly mounted to the main frame, the fixing means can fix the battery case onto the main frame.

Further, the detecting means may include an elastic body (an urging member) for urging the battery case in the non-mounting direction (i.e. in a direction that resists the battery case from being mounted to the main frame). The elastic body preferably has an elastic force larger than the weight of the battery case.

By providing this construction, the fixing means cannot fix the battery case onto the main frame merely under a condition that the battery case is mounted onto the main frame. It is only after the battery case is pressed by a force of the user to contract the elastic body in the mounting direction that the fixing means is actuated to fix the battery case onto the main frame.

Preferably, the fixing means includes a lock that fixes/releases the battery case to/from the main frame and is interlocked with a power switch, whereby the power switch is turned on when the battery case is fixed to the main frame by the lock.

By providing this construction, an electric power circuit is not energized if the battery case is not firmly mounted to the main frame, it is only after the battery case is fixed to the main frame by the fixing means that the power switch can be turned on, thereby improving the safety of the bicycle.

Preferably, the battery case is disposed in a neighborhood including at least an outer surface of the standing pipe of the main frame at a front wheel side, and the fixing means includes a lock disposed at a rear wheel side of the standing pipe and releasably fixing an upper end of the battery case to the standing pipe.

By providing this construction, the battery case will not be an obstacle for mounting and dismounting the bicycle, and the battery case can be fixed onto the standing pipe in an embracing manner, so that the battery case can be firmly fixed onto the standing pipe.

Embodiments

An electrically driven bicycle according to the present invention is now detailed with reference to the attached drawings.

Figure 1:
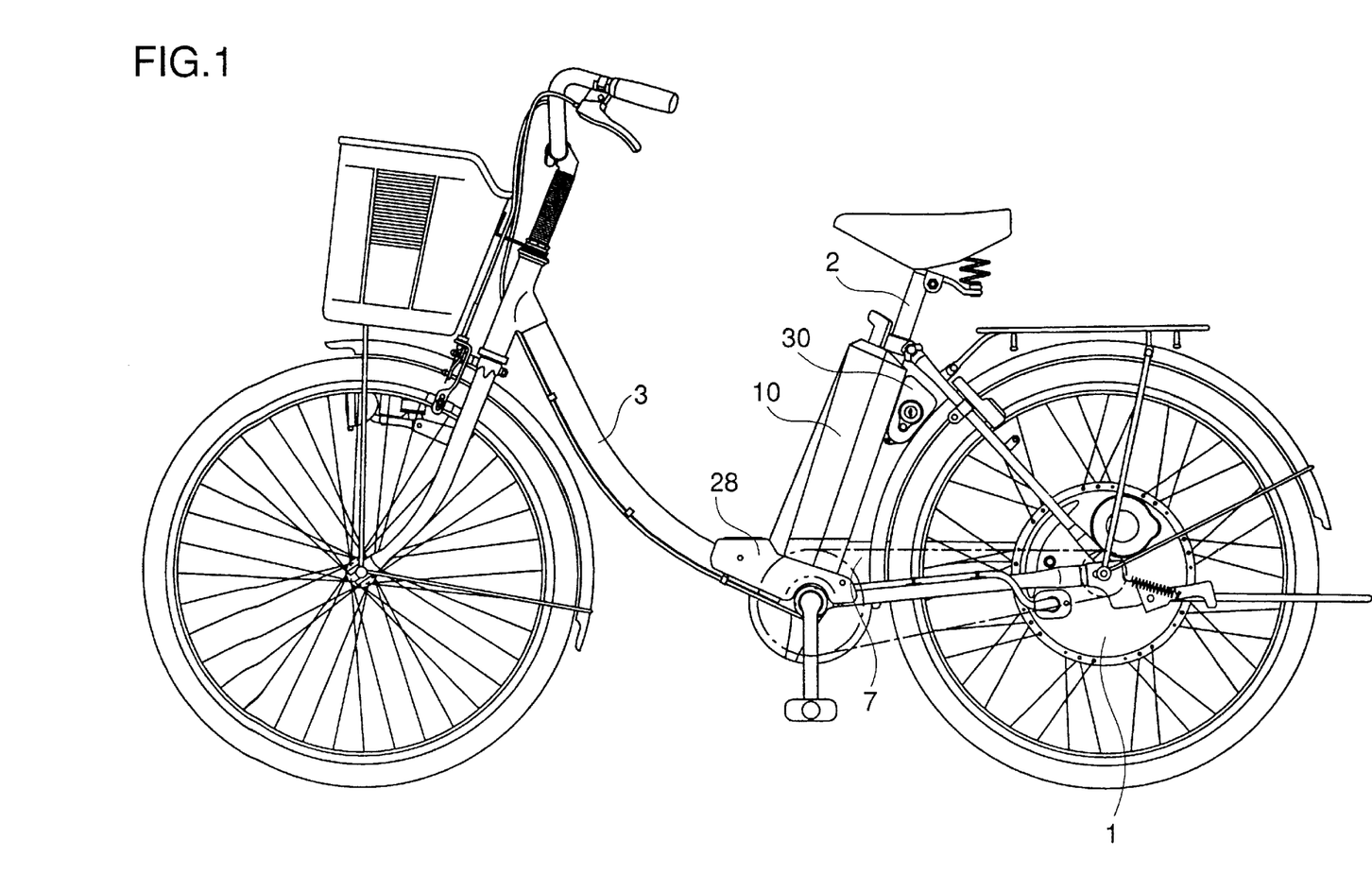
FIG. 1 is a side view of an electrically driven bicycle according to one embodiment of the present invention.
Figure 2:
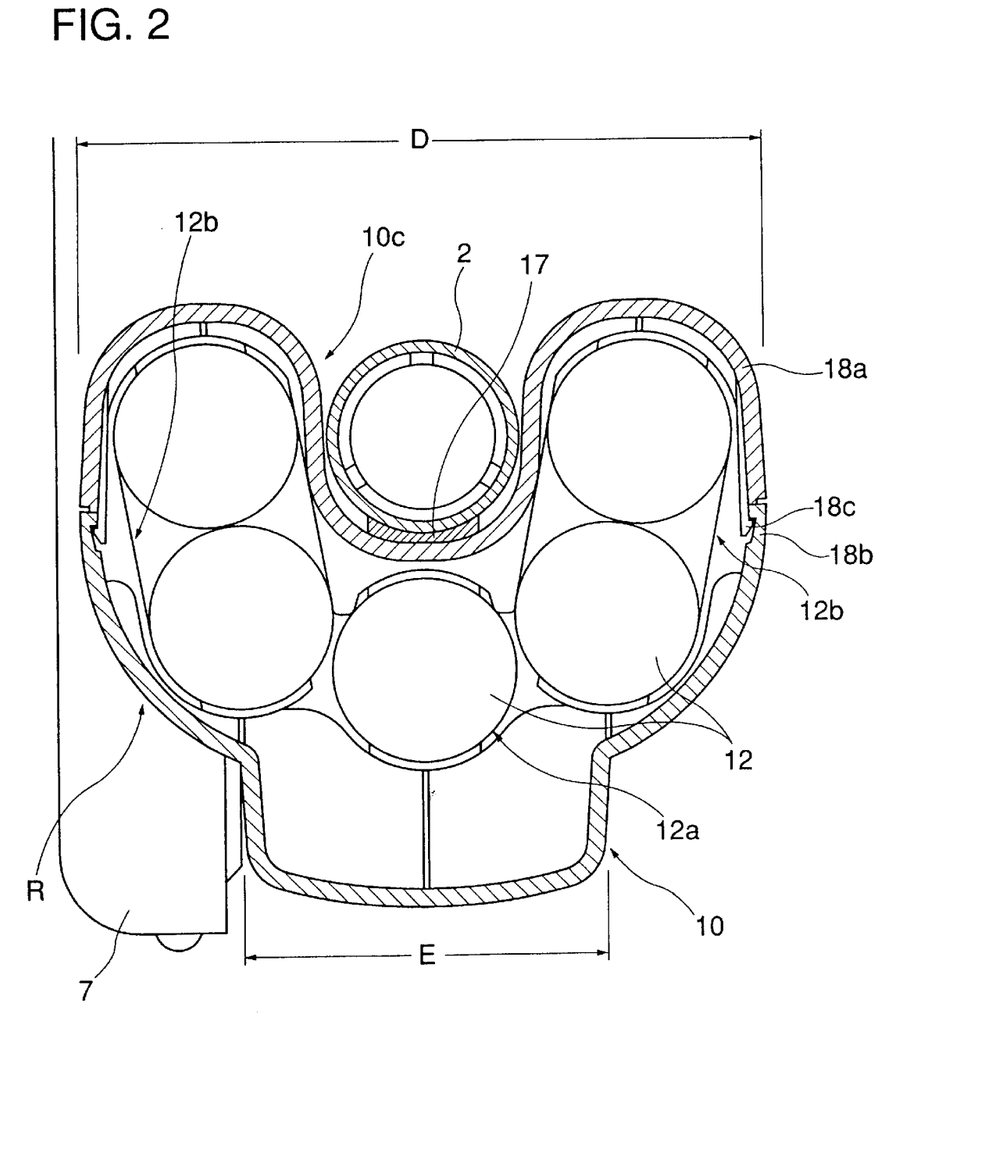
FIG. 2 is a view showing a transversal cross section of a battery case and a standing pipe of the electrically driven bicycle of FIG. 1.

Referring to FIG. 1 which illustrates a side view of an embodiment, the electrically driven bicycle of the present invention includes a driving section 1 for driving a wheel, a battery for supplying an electric power to the driving section 1, and a battery case 10 for housing the battery. The battery case 10 is mounted near a standing pipe 2 which is a component of a main frame. Referring to FIG. 2, the battery case 10 is formed to have a transversal cross section that includes a recess 10c to cover at least a part of an outer perimeter (outer surface) of the standing pipe 2.

As shown in FIG. 2, the battery case 10 is formed to have a U-shaped cross section by providing the recess 10c which covers a front wheel side and lateral sides of the standing pipe 2. In other words, the battery case 10 is disposed to cover not only the front or rear part of the standing pipe 2 but also the lateral sides of the standing pipe 2. Further, in the embodiment shown in FIG. 2, the battery case 10 is formed so that the front part thereof has a width E smaller than the width D of the battery case 10 at the standing pipe 2 side. The battery case 10 includes a rear case 18a and a front case 18b that are formed, for example, by plastic molding. The rear case 18a and the front case 18b are formed into one case by an engagement of pawls 18c.

Figure 3:
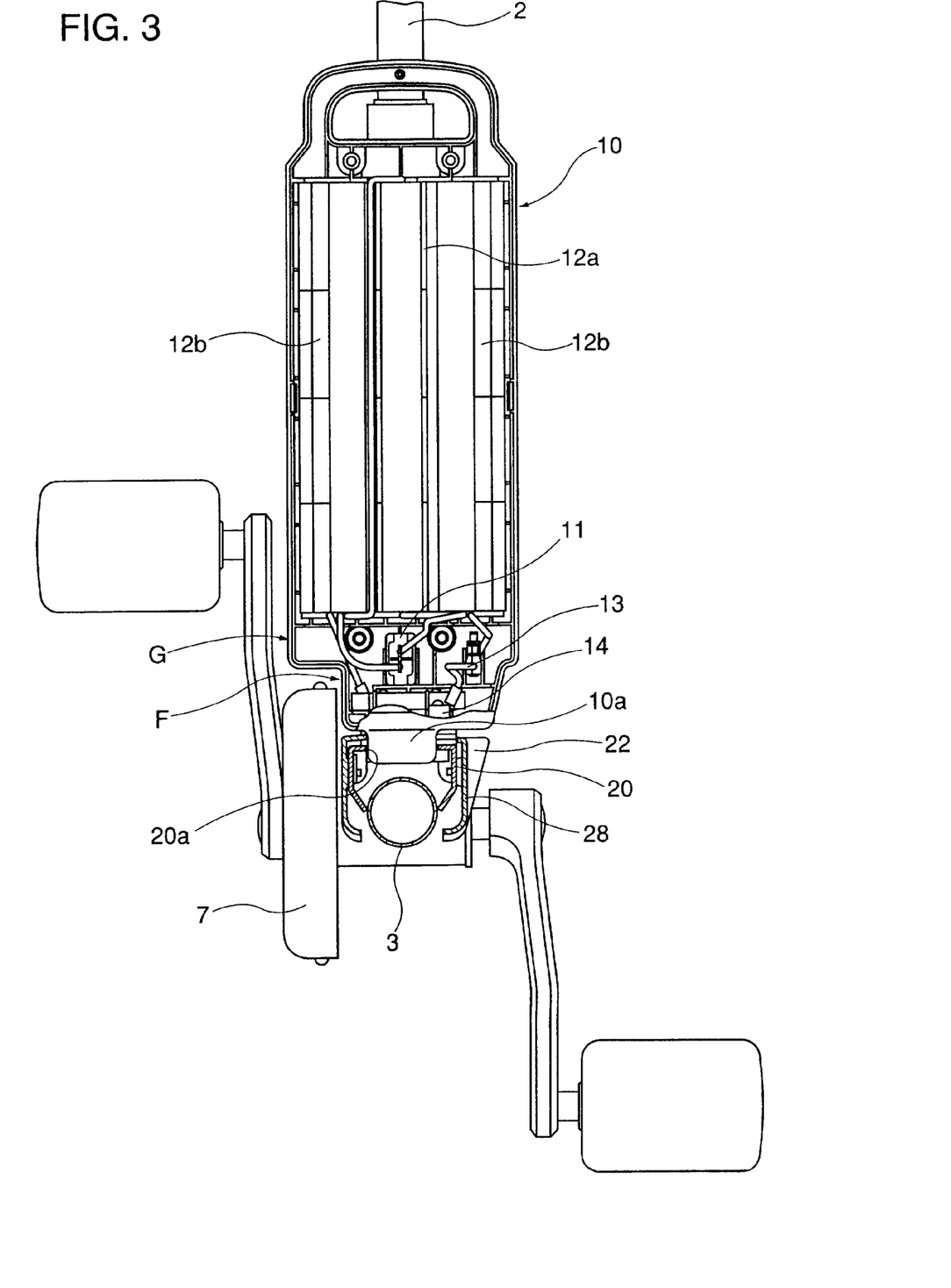
FIG. 3 is a view showing a vertical cross section of the battery case of the electrically driven bicycle of FIG. 1.

As shown by a vertical cross section in FIG. 3, the battery case 10 houses a battery assembly including a first battery pack 12a having four batteries (not shown) arranged in a line and in series connection into a packed body and two second battery packs 12b each having eight batteries arranged in two lines (each line containing four batteries) and in series connection into two packed bodies. As shown in FIG. 2, the first battery pack 12a is inserted into an inner space of a top portion which is a protrusion formed opposite to the front side of the standing pipe 2, namely, opposite to the recess 10c, and the second packs 12b are inserted in the direction from the lateral sides of the standing pipe 2 (i.e. the inner spaces on both sides of the recess 10c) towards the first pack 12a.

These twenty batteries 12 are connected together in series. In the embodiment shown in FIG. 2, the two second packs 12b are respectively inserted into the inner spaces on both sides of the standing pipe 2 in such a manner that the two second battery packs 12b are closer to each other near the first battery pack 12a. The above-mentioned pawls 18c for engaging the rear case 18a and the front case 18b are formed at a position approximately in the middle of a side surface of each second battery pack 12b.

A protrusion 10a is provided at a bottom of the battery case 10. The protrusion 10a can be inserted into an insertion hole 20a of a mounting platform 20 fixed by welding or the like to the standing pipe 2 and the main pipe 3 at a connecting part of the pipes 2, 3. Further, the lower end of the battery case 10 is formed to have a smaller width in order to evade the chain case 7 (See F of FIG. 3), and an upper portion of the battery case 10 above the chain case 7 is formed to have a larger width (See G of FIG. 3). The batteries 12 are inserted into the upper and wider portion of the battery case 10 so that the batteries are approximately symmetrical in the right-and-left direction with respect to a central plane (the plane formed by the center line of the standing pipe 2 and the center line of the main pipe 3). Further, electric components such as a charging connector 11, a fuse 13, and an output terminal 14 are disposed in the lower and narrower portion of the battery case 10. Therefore, the upper and wider portion of the battery case 10 can be used exclusively as a space for the batteries 12, so that the batteries 12 can be arranged efficiently in the battery case 10.

The lower end of the battery case 10 as shown above is fixed near the standing pipe 2 by insertion of its protrusion 10a into the insertion hole 20a of the mounting platform 20. The upper portion of the battery case 10 is clamped, in interlocking relationship with the rotation of the key that switches the output of the battery on and off, by means of metal clamp 33 of a key box 30 that is attached to the standing pipe 2. The output terminal of the battery case 10 will be connected to a connection pin of a terminal platform 22 provided on the mounting platform 20 when the battery case 10 is mounted on the mounting platform 20. Also, an elastic sheet 17 is mounted with adhesive onto an inner surface of the recess 10*c* of the battery case 10 so that the battery case 10 is firmly fixed onto the standing pipe 2 without causing a wobble. The periphery of the mounting platform 20 is covered by a frame cover 28 to protect the mounting platform 20 and to maintain good appearance.

The other components such as a front wheel, a rear wheel, a handlebar, a saddle, a pedal, and a chain are the same as those of an ordinary bicycle, and the functions performed by a brake and the like are also the same, so that an explanation thereof will be omitted here. In the previous example, the battery case 10 is disposed in the front and on the lateral sides of the standing pipe 2 so as to cover the standing pipe 2. The same explanation will apply also to the case in which the battery case 10 is mounted near another portion of the main frame, such as the main pipe. The central portion of the battery case 10 disposed at the front side opposite to the recess and facing away from the structural support of the main frame may be formed to have a continuous arc-like shape. The front side of the battery case 10 can also be formed to have a narrow projection in its traversal cross section.

As described above, the battery case 10 in the electrically driven bicycle of the present invention includes the recess 10*c* that covers a structural support member of the main frame. Accordingly, the thickness or the height of the battery case 10 protruding forward or upward from the main frame can be made smaller than in conventional bicycles, so that the battery case 10 will not be an obstacle in mounting and dismounting the bicycle. Also, even if the battery case 10 extends in the lateral direction of the standing pipe 2 or the main pipe, the width of the battery case 10 is smaller than the distance between the pedals, so that the battery case 10 will not be an obstacle in operating the pedals or in mounting and dismounting the bicycle, thereby providing an electrically driven bicycle with great facility in mounting and dismounting the bicycle. The facility in mounting and dismounting the bicycle will be further improved in the case where the top portion of the protrusion (the front portion opposite to the recess) of the battery case 10 is formed to have an arc-like shape or to have a smaller width in its transversal cross section.

The plurality of batteries 12 to be inserted into the battery case 10 having the above structure cannot be inserted together as a bundle. However, the width of the battery case 10 at its front or upper portion can be made smaller than the width of the battery case 10 at its lateral sides by dividing the batteries 12 into a first pack 12*a* having a plurality of batteries 12 arranged in a line and two second packs 12*b* each having a plurality of batteries arranged in two lines and by inserting each of the two second packs 12*b* respectively into an inner space on each side of the recess 10*c* and inserting the first pack 12*a* into the protrusion opposite to the recess 10*c*. Therefore, the battery case 10 can be formed into a smooth arc-like shape without a square shoulder portion (See R portion in FIG. 2).

In other words, if the two second packs 12*b* of batteries are inserted parallel to each other, their shoulder portions will protrude greatly like a square, so that the width of the battery case at its front or upper portion will be wider. However, by inserting the two second packs 12*b* of batteries 12 obliquely so that they are not parallel to each other, the width of the battery case 10 at its front or upper portion can be made smaller, as described before. Further, since the two second packs 12*b* of batteries 12 disposed on the lateral sides of the battery case 10 are obliquely arranged so that they are closer to each other at the front or upper portion thereof, a space for engagement of the pawls 18*c* can be ensured by dividing the battery case 10 into two portions and providing the engagement portions on the lateral sides of the two second packs 12*b*. As a result, the battery case 10 can be formed to be compact and with a narrow width at its front or upper portion.

Further, by allowing the rear or bottom portion of the battery case 10 to have a narrower width, the chain case 7 can be evaded and, moreover, by mounting the electric components such as an output terminal and a connector in the narrower portion, the batteries 12 can be arranged in the wider portion above the chain case 7 so that the batteries 12 are approximately in symmetry in the right-and-left direction with respect to the central plane, thereby providing a battery case 10 which is compact and stable.

Figure 4:
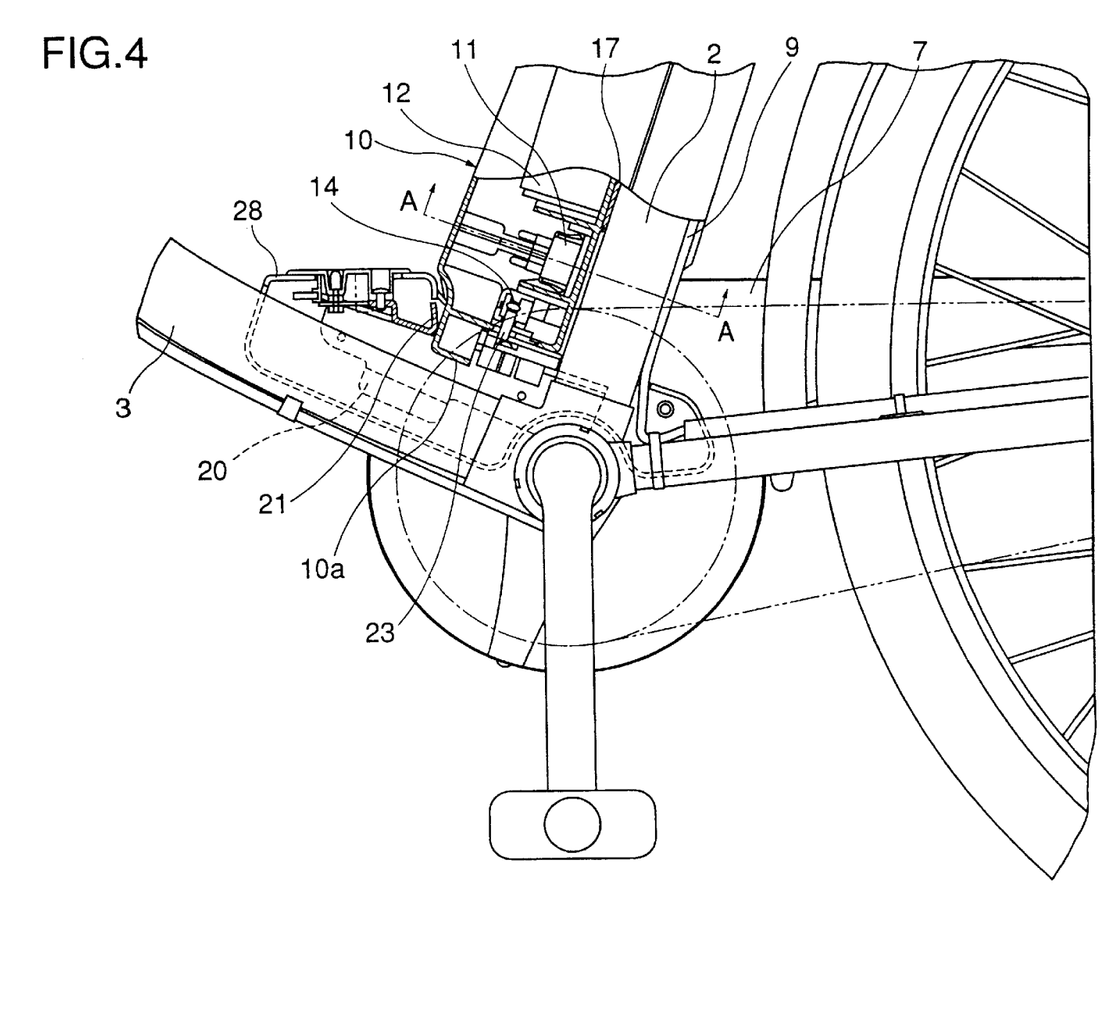
FIG. 4 is a view showing a cut out section of a charging connector section in the electrically driven bicycle of FIG. 1.
Figure 5:
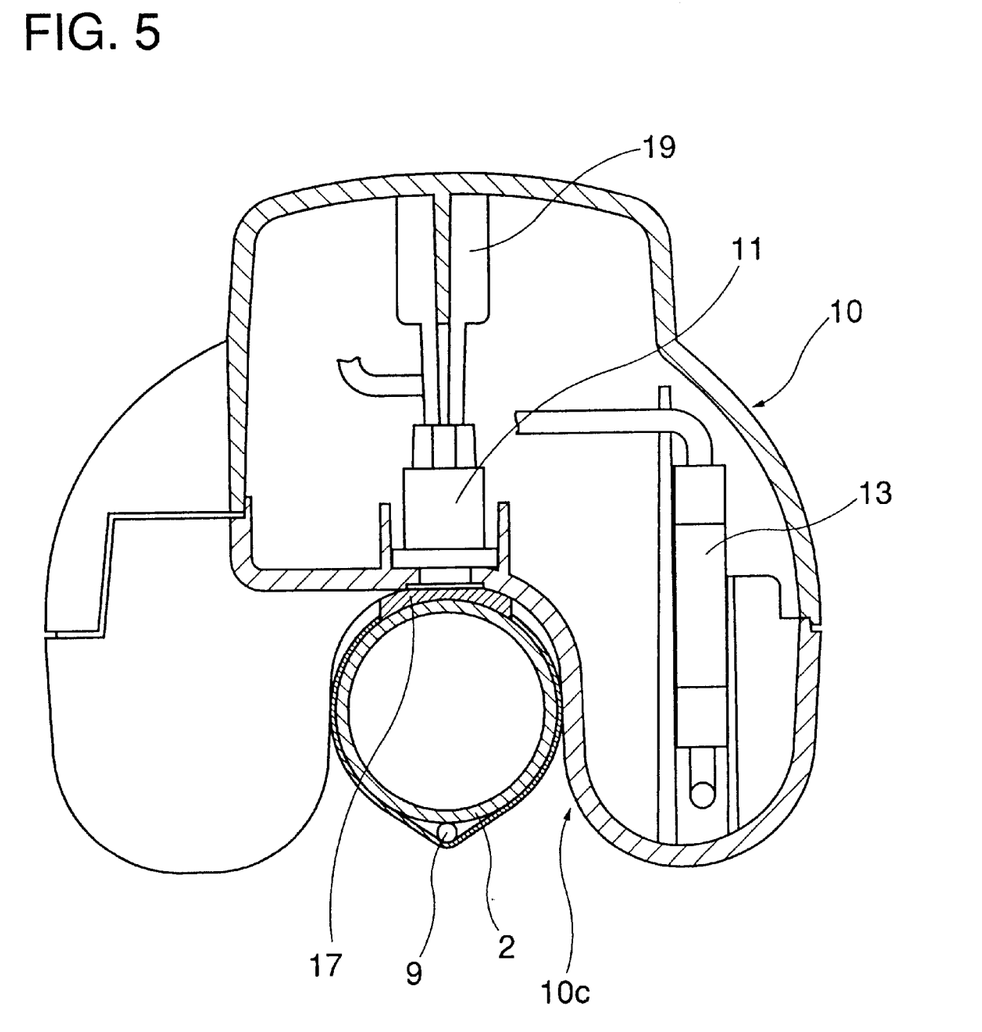
FIG. 5 is a cross-sectional view cut along the line A—A of FIG. 4.

The charging connector 11 for charging the rechargeable batteries 12 is disposed at the standing pipe 2 side of the battery case 10, as shown in FIG. 4 which illustrates a vertical cross section of that portion. Further, the battery case 10 is mounted so that the charging connector 11 is hidden by the standing pipe 2, as shown in FIG. 5 which illustrates a cross section cut along the line A—A of FIG. 4.

A protrusion 10*a* is disposed at the bottom of the battery case 10. The protrusion 10*a* engages with an insertion hole 20*a* provided in the mounting platform 20 and is fixed thereto by a tongue piece 21 of the mounting platform 20 for preventing the battery case 10 from falling forward. Also, in this example, an output terminal 14 is disposed to be in contact with a connection pin 23 provided on the mounting platform 20, so that the output from the batteries 12 can be utilized simply by mounting the battery case 10 onto the mounting platform 20.

An upper portion of the battery case 10 is fixed by being pulled towards the standing pipe 2 by means of a key box 30, as shown in FIG. 1. Therefore, the upper portion of the battery case 10 can be easily dislodged by releasing the fixation performed by the key box 30 and pulling the upper portion of the battery case 10 upward while allowing the battery case to lean a little forward. Conversely, in mounting the battery case 10, the protrusion 10*a* at the bottom of the battery case 10 is inserted into the insertion hole 20*a* of the mounting platform 20 by mounting the battery case 10 onto the mounting platform 20 while allowing the battery case 20 to lean a little forward, and the battery case 10 is mounted in place by allowing the upper portion of the battery case 10 to approach toward the standing pipe 2, whereby the battery case 10 can be easily fixed by means of the key box 30.

In the present invention, the charging connector 11 is disposed at a position at the bottom of the battery case 10 and at a center of the side which is in contact with the standing pipe 2. The rechargeable batteries can be charged, for example, by inserting a plug, which is provided in a charger (not shown), into the charging connector 11. Since the charging connector 11 is provided on the standing pipe 2 side of the battery case 10 in the present invention, the batteries 12 cannot be charged while the battery case 10 is mounted on the main frame. The batteries 12 are charged by dislodging the battery case 10 and inserting the plug of the charger. Meanwhile, an opening of the charging connector 11 is blocked by the standing pipe 2, so that the charging connector 11 is not visible from outside at all and is mounted directly in contact with the standing pipe 2 without a cap.

In this example, an elastic sheet 17 is disposed between the battery case 10 and the standing pipe 2. The elastic sheet 17 is, for example, made of an expanded urethane foam and is preferably disposed so that the elastic sheet 17 can fix the battery case 10 to the standing pipe 2 firmly and can prevent wobbling of the battery case 10. In the example shown in FIG. 4 and FIG. 5, the elastic sheet 17 is disposed at a position above the connector 11. By providing the elastic sheet 17 at a position above the connector 11, the elastic sheet 17 will not be an obstacle in charging the batteries even if the elastic sheet 17 is kept fixed onto the battery case 10. Moreover, the rain water running down from above can be prevented from entering into the connector 11. Alternatively, however, if the elastic sheet 17 is bonded onto the standing pipe 2, the elastic sheet 17 can lie over the connector 11 as well, thereby further preventing the wobbling of the battery case 10 and the entering of water into the connector 11.

Figure 6:
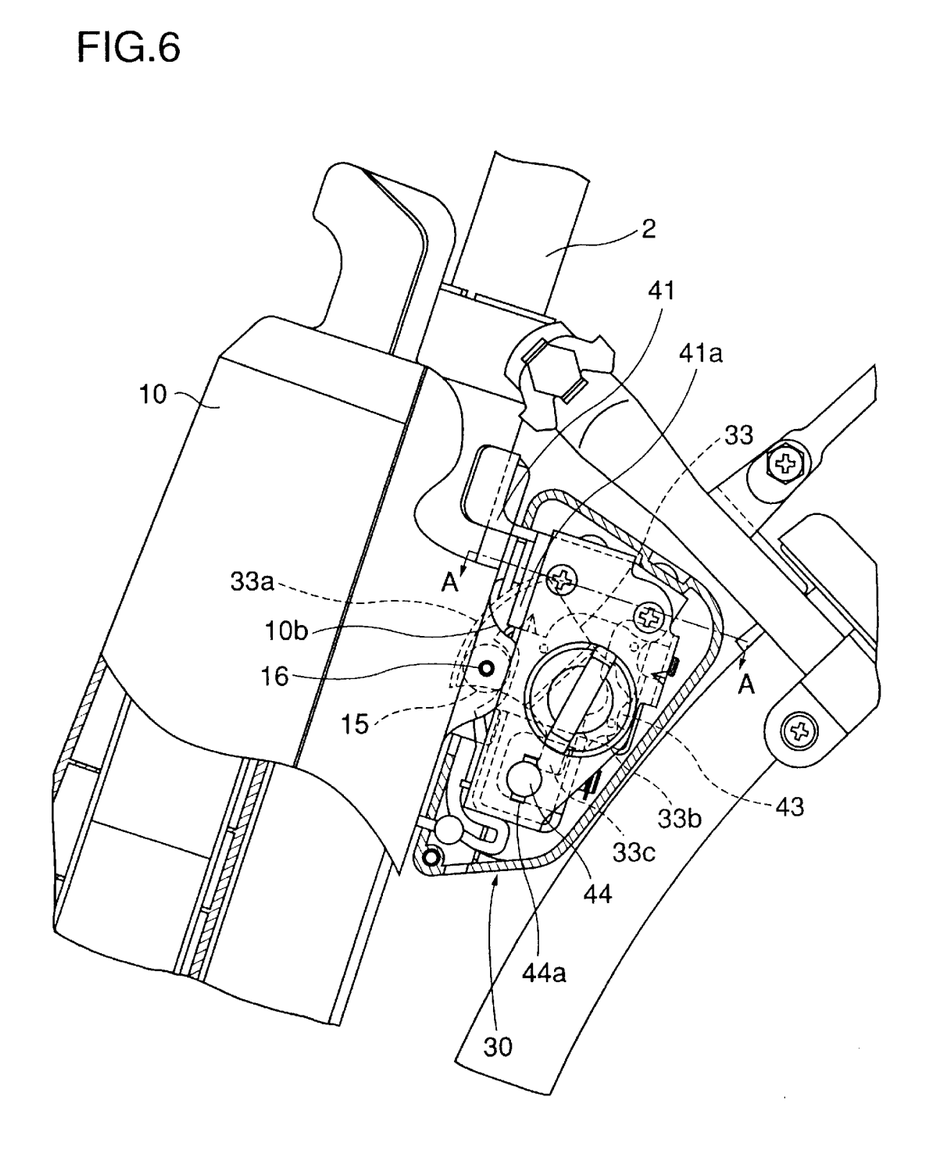
FIG. 6 is a cross-sectional view showing a fixed state of an upper portion of the battery case by means of a fixing means.

In the electrically driven bicycle of the present invention, the upper portion of the battery case 10 is fixed by means of a fixing member (metal clamp 33) of the key box 30 which is mounted on the standing pipe 2, as shown in FIG. 6.

Figure 7:
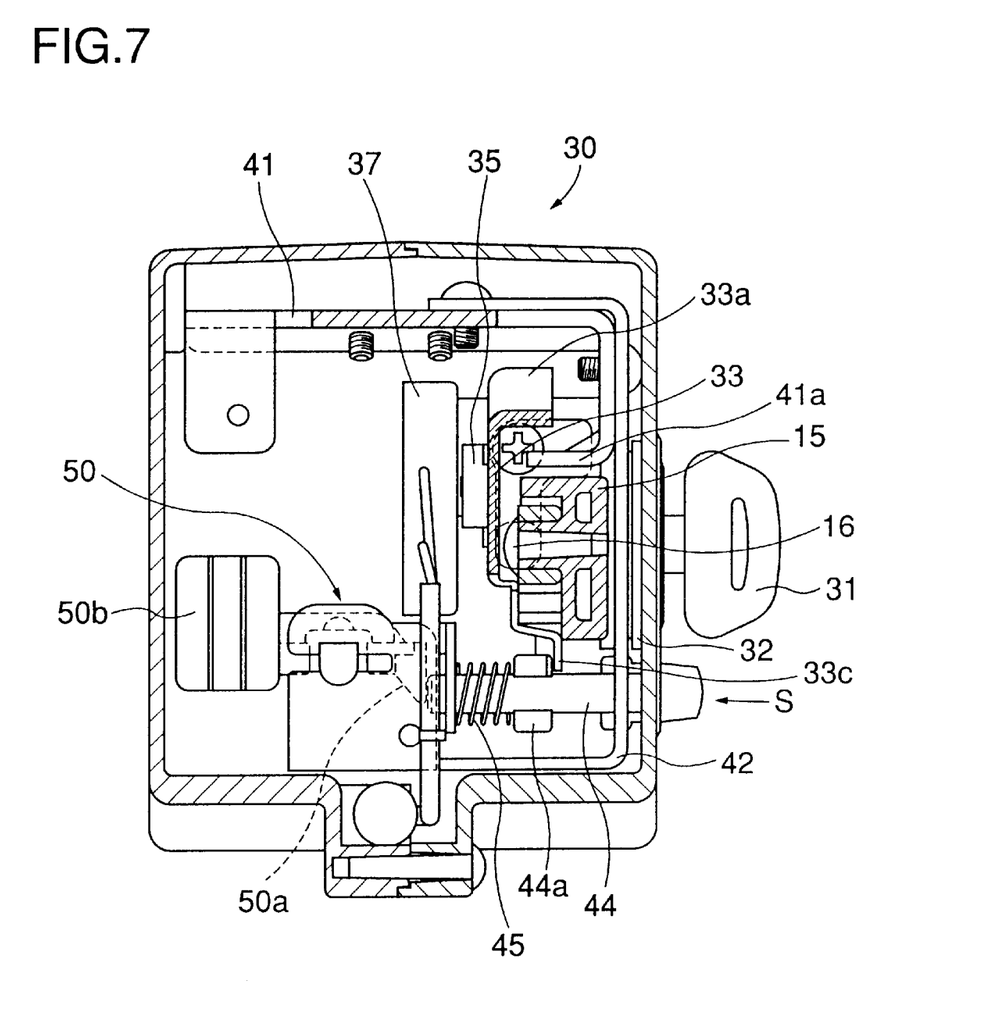
FIG. 7 is a cross-sectional view cut along the line A—A of FIG. 6.

In the key box 30, the metal clamp 33, which constitutes the fixing member, is fixed by means of a screw (not shown) onto a key station 32 which is rotatable by insertion of a key 31, as shown in FIG. 7. A clamping portion 33a having an arc-like inner surface is formed on a part of the outer circumference of the metal clamp 33 and is capable of being in sliding contact with an outer circumference of a cylindrical body or tubular body by rotation, whereby the clamping portion 33a is brought into sliding contact with a sliding portion (roller 15) which is disposed on the battery case 10 and having a circular outer circumference (See FIG. 5). A magnet 35 is mounted on the metal clamp 33 so that a reed switch (not shown) attached on a substrate (not shown) mounted on a substrate mounting frame 37 is turned on when the magnet 35 approaches the reed switch. In other words, by a predetermined amount (one stage) of rotation of the key 31, the clamping portion 33a of the metal clamp 33 is brought into sliding contact with the sliding portion of the battery case 10 to fix the battery case 10. By one further stage of rotation, the magnet 35, while maintaining the sliding state, approaches the reed switch to turn the power on.

Figure 8:
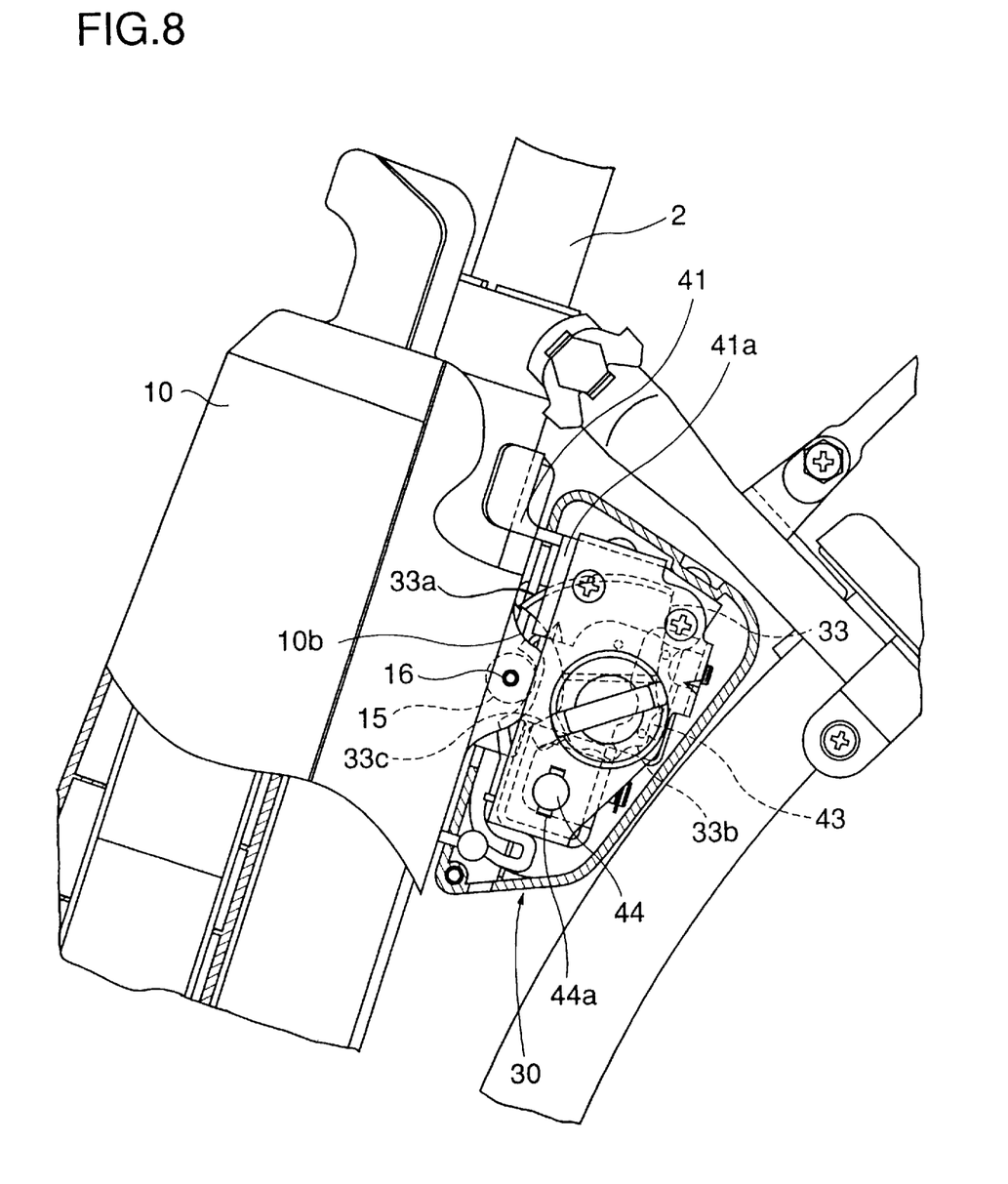
FIG. 8 is a cross-sectional view showing a non-fixed state of the upper portion of the battery case by means of a fixing means.

A concave-convex portion 33b is formed on the outer circumference of the metal clamp 33 opposite to the clamping portion 33a, as shown in FIG. 6 or FIG. 8, to engage with a spring piece 43 formed by an elastic body that has a shape engaging with its concave portion, thereby allowing clicks in the rotation of the key 31 (so that the key rotates stage by stage). The spring piece 43 is mounted onto a key stay 42 by a screw. Further, a pawl portion 33c is formed adjacent to the concave-convex portion 33b. In releasing the fixation of the battery case 10, the pawl portion 33c strikes a projecting piece portion 44a of a stopper pin 44 to inhibit the rotation of the key 31.

Since the stopper pin 44 is mounted onto the key stay 42 via a spring 45 as shown in FIG. 7, the projecting piece portion 44a of the stopper pin 44 is dislodged from the pawl portion 33c by pressing the stopper pin 44 in the direction of S so as to rotate the key 31 in the releasing direction. Namely, in order to prevent the battery case 10 from falling off by inadvertent rotation of the key 31 in the releasing direction, the battery case 10 is disengaged by rotating the key 31 while pressing the stopper pin 44. The pawl portion 33c is formed in a twisted shape, so that the key 31 can be rotated in a reverse direction, namely in the direction for mounting the battery case 10, without pressing the stopper pin 44.

A pressing member 50, which is a detecting means made of resin, is disposed in contact with a front tip of the stopper pin 44 as seen in the direction of S. The pressing member 50 includes a restricting section 50a and a contact section 50b. The restricting section 50a is brought into contact with the stopper pin 44. The contact section 50b is brought into contact with a protrusion 10c formed on the battery case 10 for being detected and is pressed when the battery case 10 is mounted. Further, the pressing member 50 is provided with a spring 51 which is an elastic body for urging the battery case 10 in the direction which resists the battery case 10 from being mounted.

Figure 9:
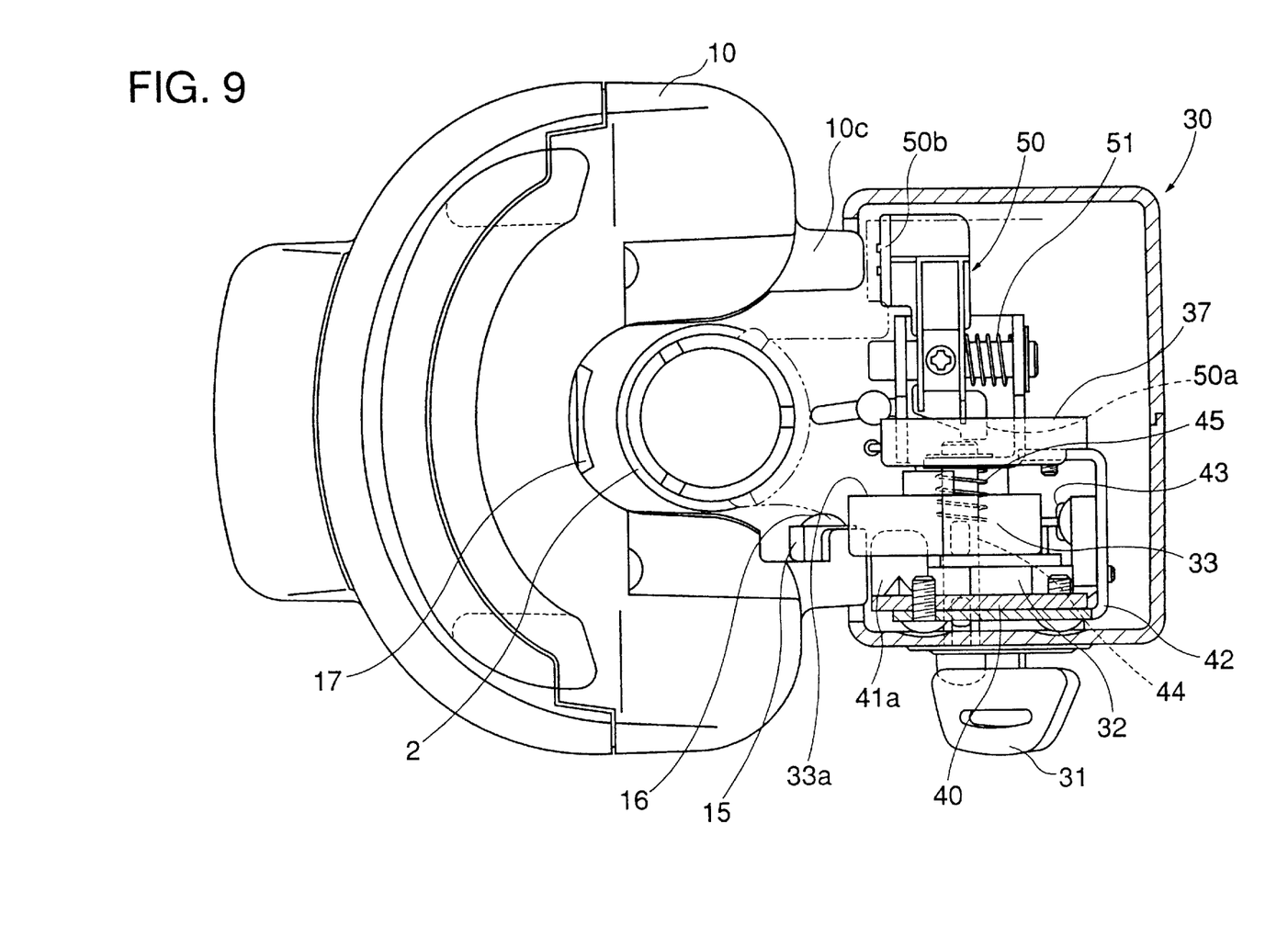
FIG. 9 is a cross-sectional view of the upper portion of the battery case and fixing means of FIG. 8.
Figure 10:
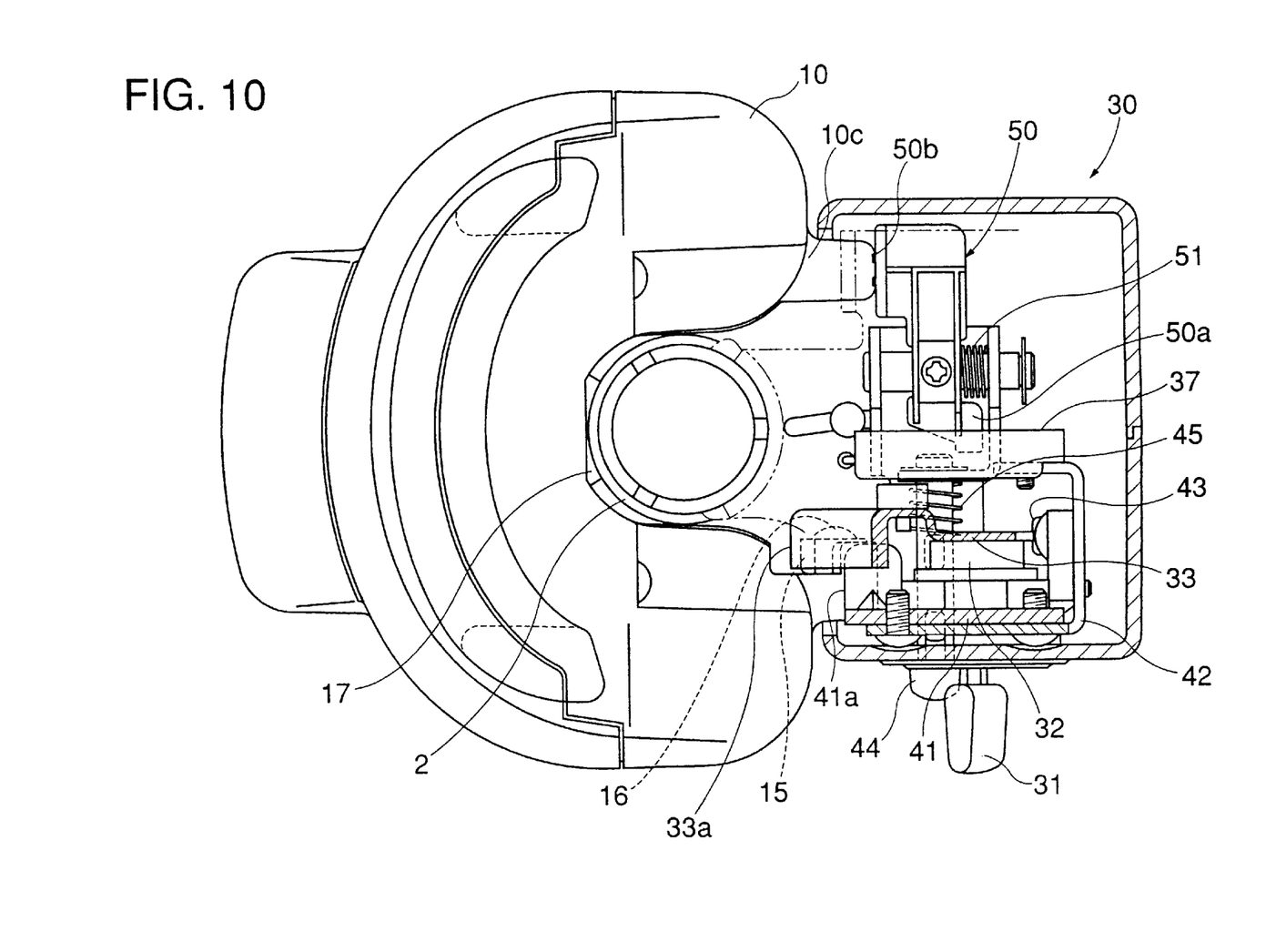
FIG. 10 is a cross-sectional view of the upper portion of the battery case and fixing means of FIG. 6.

When the battery case 10 is not mounted, the pressing member 50 is pressed towards the battery case 10 by a force of the spring 51 as shown in FIG. 9, so that the restricting section 50a and the stopper pin 44 are in contact and the stopper pin 44 cannot be pressed by the user. Also, when the battery case 10 is mounted as shown in FIG. 10, the pressing member 50 is pressed by the protrusion 10c of the battery case 10, so that the contact between the stopper pin 44 and the restricting section 50a is released and the stopper pin 44 can be operated. The force of the spring 51 for urging the pressing member 50 is set to such a degree that the spring 51 does not contract merely under the condition that the battery case 10 is mounted, so that the pressing member 50 can be moved only after the battery case 10 is pressed into a mounted state by a force of the user.

In the key box 30, metal fittings 41 are fixed by adhesion to the standing pipe 2, as shown in FIG. 6 and FIG. 8. The above-mentioned key station 32 and the substrate 37 are fixed onto the metal fittings 41 as shown in FIG. 7, and further the key stay 42 for holding the stopper pin 44 and the spring 45 is fixed by the screw 46. A tongue piece 41a is provided on the metals fittings 41 and is disposed above the projection 10b of the sliding portion of the battery case 10. As a result, the battery case 10 is prevented from being dislodged upwards by the upward and downward vibration of the battery case 10. Naturally, the lower portion of the battery case is held by the mounting platform 20.

The other components such as a front wheel, a rear wheel, a handle, a saddle, a pedal, and a chain are the same as those of an ordinary bicycle, and the functions performed by a brake and the like are also the same, so that an explanation thereof will be omitted here. In the previous example, the battery case 10 is mounted onto the standing pipe. The same explanation will apply also to the case in which the battery case 10 is mounted onto another portion of the main frame such as the main pipe and if the battery case 10 is mounted in a vertical direction or in an oblique direction.

Next, with reference to FIGS. 6, 10, 8, and 9, an explanation will be given on the operations of attaching/detaching the battery case 10 and turning the switch on/off by operating the key 31 of the key box 30. Referring to FIGS. 8 and 9, the upper portion of the battery case 10 is not fixed while the clamping portion 33a of the metal clamp 33 is not in sliding contact with the sliding portion of the battery case 10, and the battery case 10 can be dislodged by tilting the upper portion of the battery case 10 forward and pulling it out. Here, the battery case 10 cannot be brought from the fixed state into this released state unless the stopper pin 44 is pressed as described before.

On the other hand, the battery case 10 containing the recharged batteries is mounted on the mounting platform 20 so that the protrusion 10a of the battery case 10 is inserted into the insertion hole 20a of the mounting platform 20, and then the key 31 is rotated while allowing the upper portion of the battery case 10 to be in close contact with the standing pipe 2, whereby the clamping portion 33a of the metal clamp 33 is brought into sliding contact with the sliding portion 15 of the battery case 10 and, by rotating the metal clamp 33 into the state shown in FIG. 6, the upper portion of the battery case 10 is fixed and the power is turned on. Further, when the metal clamp 33 is rotated by rotating the key 31, the switch is turned off.

Next, an explanation of the operation for mounting the battery case 10 will be given. In the case where the battery case 10 is dislodged for charging or the like, the position of the key 31 is such that the key 31 has been rotated clockwise, as shown in FIG. 8. This state prevents the user from pressing the stopper pin 44 because the stopper pin 44 and the restricting section 50a of the pressing member 50 are in contact, as shown in FIG. 9. When the battery case 10 is mounted and the battery case 10 is pressed against the force of the spring 51 by the user, the contact portion 50b is pressed by the protrusion 10c and the pressing member 50 is pressed upwards as a whole in the Figure, releasing the contact between the restricting section 50a and the stopper pin 44, whereby the stopper pin 44 can be pressed by the user. By this construction, the key 31 cannot be rotated and an electric power cannot be supplied from the batteries unless the battery case 10 is firmly mounted.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. An electrically driven bicycle comprising:
   a main frame;
   a driving section for driving a wheel;
   at least one battery supplying electric power to said driving section;
   a battery case enclosing said at least one battery and mounted on said bicycle;
   said battery case including a transverse cross section that includes a recess adapted to cover at least a part of an outer surface of a structural support member of said main frame; and
   wherein said at least one battery includes a first battery pack having a plurality of batteries, and at least two second battery packs each having a plurality of batteries;
   said battery case including a protrusion opposite said recess;
   said first battery pack being inserted into an inner space of said protrusion; and
   each of said at least two secondary battery packs being respectively inserted into battery case inner space on each side of said recess wherein said at least two second battery packs are closer to each other in a direction towards said first battery pack.

2. An electrically driven bicycle comprising:
   a main frame;
   a driving section for driving a wheel;
   batteries for supplying electric power to said driving section;
   a battery case enclosing said batteries and mounted on said bicycle;
   said battery case including a transverse cross section that includes a recess adapted to cover at least a part of an outer surface of a structural support member of said main frame;
   a saddle;
   said main frame includes a standing pipe and a main pipe;
   said standing pipe extending obliquely in a downward and forward direction from said saddle;
   said main pipe being connected by a connecting part to said standing pipe and extending obliquely in an upward and forward direction from said connecting part;
   said electrically driven bicycle further comprising a chain case and a mounting platform, said chain case extending toward a rear wheel from said connecting part of said standing pipe and said main pipe; and
   said mounting platform being disposed at said connecting part and serving to mount said battery case on said standing pipe by mounting a lower end of said battery case on said mounting platform, the battery case being provided with a narrow portion and a wide portion, the narrow portion being disposed at the lower end of the battery case and formed to have a width smaller than that of an upper portion of the battery case in a right-and-left direction so as not to interfere with the chain case, the narrow portion being provided with an output terminal for the batteries, the wide portion being disposed at the upper portion of the battery case and extending above the chain case, the batteries being inserted into an inner space of the wide portion so that the batteries are substantially symmetrical with respect to a central plane formed by a center line of the standing pipe and a center.

3. An electrically driven bicycle according to claim 2, wherein said battery case includes a narrow portion and a wide portion;
   said narrow portion being disposed on said lower end of said battery case; and
   said narrow portion having a width smaller than that of an upper portion of said battery case, thereby avoiding interference with said chain case.

4. An electrically driven bicycle according to claim 3, wherein said narrow portion includes an output terminal for said at least one battery;
   said wide portion being disposed on said upper portion of said battery case and extending above said chain case; and
   said at least one battery being inserted into said inner space of said wide portion of said battery case such that said at least one battery is substantially symmetrical with respect to a central plane formed by a center line of said standing pipe and a center line of said main pipe.

5. An electrically driven bicycle comprising:
   a main frame;
   a driving section for driving a wheel;
   at least one battery supplying electric power to said driving section;
   a battery case enclosing said at least one battery and mounted on said bicycle;
   said battery case including a transverse cross section that includes a recess adapted to cover at least a part of an outer surface of a structural support member of said main frame;
   said at least one battery is rechargeable and said battery case includes a charging connector section for charging said at least one battery, said charging connector section facing said structural support member; and
   said battery case being mounted onto said bicycle in such a manner that said charging connector section is in direct contact with said structural support member, and wherein said battery case and said structural support member form an enclosure blocking view of said charging connector section.

6. An electrically driven bicycle according to claim 5, further comprising an elastic sheet; and said elastic sheet being disposed at a contacting part of said battery case and said structural support member.

7. An electrically driven bicycle according to claim 6, wherein said battery case is mounted onto said structural support member; and said elastic sheet is disposed above said connector section of said battery case.

8. An electrically driven bicycle according to claim 5, wherein a side surface of said battery case covers a side portion of said outer surface of said structural support member of said bicycle.

9. An electrically driven bicycle according to claim 8, wherein said battery case includes a U-shaped portion having a substantially U-shaped transversal cross section; and said connector section is disposed at a bottom of said U-shaped portion.

10. An electrically driven bicycle comprising:

a main frame;

a driving section for driving a wheel;

at least one battery supplying electric power to said driving section;

a battery case enclosing said at least one battery and mounted on said bicycle;

said battery case including a transverse cross section that includes a recess adapted to cover at least a part of an outer surface of a structural support member of said main frame;

a mount detecting means and a fixing means;

said mount detecting means detecting that said battery case is mounted to a predetermined position on said bicycle;

said fixing means fixing said battery case to said bicycle;

said fixing means fixes said battery case to said bicycle only when said mount detecting means detects that said battery case is mounted to said bicycle;

said structural support member includes a standing pipe;

said battery case being disposed on a front side of said standing pipe; and said fixing means includes a lock disposed on a rear side of said standing pipe and releasably fixing an upper end of said battery case to said standing pipe.

11. An electrically driven bicycle according to claim 10, wherein said mount detecting means includes an urging member for urging said battery case in a direction that resists said battery case from being mounted.

12. An electrically driven bicycle according to claim 10, wherein said fixing means includes a lock that fixes/releases said battery case to/from said bicycle; and said lock being interlocked with a power switch, whereby said power switch is turned on when said battery case is fixed to said bicycle by said lock.

* * * * *